United States Patent [19]
Mochizuki et al.

[11] Patent Number: 5,270,850
[45] Date of Patent: Dec. 14, 1993

[54] LASER SCANNER

[75] Inventors: Takeshi Mochizuki; Susumu Saito, both of Ibaraki; Akira Arimoto, Tokyo, all of Japan

[73] Assignees: Hitachi Koki Co. Ltd.; Hitachi Ltd., both of Tokyo, Japan

[21] Appl. No.: 925,787

[22] Filed: Aug. 7, 1992

[30] Foreign Application Priority Data

Aug. 20, 1991 [JP] Japan ................................. 3-207999

[51] Int. Cl.⁵ .............................................. G02B 26/08
[52] U.S. Cl. .................................. 359/206; 359/216; 359/718
[58] Field of Search ............... 359/206, 662, 216–219, 359/708, 718, 793–795

[56] References Cited

U.S. PATENT DOCUMENTS

| 4,179,183 | 12/1979 | Tateoka et al. | 359/206 |
| 4,963,900 | 10/1990 | Budd et al. | 359/206 |
| 5,086,350 | 2/1992 | Nishihata | 359/206 |
| 5,111,325 | 5/1992 | DeJager | 359/206 |

FOREIGN PATENT DOCUMENTS

| 54-126051 | 9/1979 | Japan . |
| 62-265615 | 11/1987 | Japan . |
| 1-14564 | 3/1989 | Japan . |
| 1-15046 | 3/1989 | Japan . |
| 64222698 | 4/1991 | Japan . |
| 3-191316 | 8/1991 | Japan ................................. 359/206 |

OTHER PUBLICATIONS

"Laser Scanning System Using a Rotationally Asymmetric Aspheric Surface", Akira Arimoto, Susumu Saitoh, Shigeo Moriyama, Yoshimasa Kondou, and Takeshi Mochizuki, *Applied Optics*, 20, Feb. 1991, vol. 30, No. 6. pp. 699–704.

German Search Report, Jan. 27, 1993.

*Primary Examiner*—Bruce Y. Arnold
*Assistant Examiner*—James Phan
*Attorney, Agent, or Firm*—Sughrue, Mion, Zinn, Macpeak & Seas

[57] ABSTRACT

A laser scanner which includes a rotary polyhedral mirror for scanning a light beam from a laser light source, and an Fθ lens system which includes first and second lenses through which the light beam is radiated onto a scanning plane. The first lens of the Fθ lens system is provided on the rotary polyhedral mirror side and is constructed with a joined lens, to increase the degree of design of the first lens. This design freedom for the Fθ lens system improves the Fθ characteristic (i.e., characteristic of displacement on a scanning plane), the field curvature characteristic (i.e., characteristic of image defocusing on the scanning plane) and similar problems.

16 Claims, 7 Drawing Sheets

LASER SCANNER

BACKGROUND OF THE INVENTION

1. Field of the Invention

The present invention relates to a laser scanner, and particularly it relates to a laser scanner and a non-spherical scanning lens suitable for use in high precision laser printers.

2. Description of the Prior Art

In a conventional laser printer, a laser beam 100 (FIG. 2) performs deflection scanning with the use of a rotary polyhedral mirror 10, to write information onto a scanning plane (photosensitive drum) 16. An F$\theta$ lens system is used to correct problems such as focusing (i.e. field curvature), disposition (i.e. aberration of distortion) and the like, which are produced on the scanning plane 16 during scanning. The field curvature refers to the defocusing characteristic of an image on the scanning plane. The F$\theta$ lens system 1 corrects the aberration of distortion and the field curvature so that the scanning angle and scanning position of the rotary polyhedral mirror 10 are proportional to each other. The conventional F$\theta$ lens system 1 includes two single lenses (first and second lenses 51 and 52).

However, one source of errors in the above-mentioned conventional scanning system is a side fall error of a rotary polyhedral mirror produced by processing which occurs during manufacturing. Therefore, an anamorphic optical system has been constructed with an F$\theta$ lens system which is made to include cylindrical surfaces or toric surfaces that provide a side fall correction function to correct the above-mentioned error. Examples of side fall corrective systems are disclosed in Japanese Patent Unexamined Publication Nos. Sho. 54-126051 and Sho. 57-144515 (Japanese Patent Examined Publication No. Hei. 1-15046) and Japanese Patent Examined Publication No. Hei. 1-14564.

Figure 2:
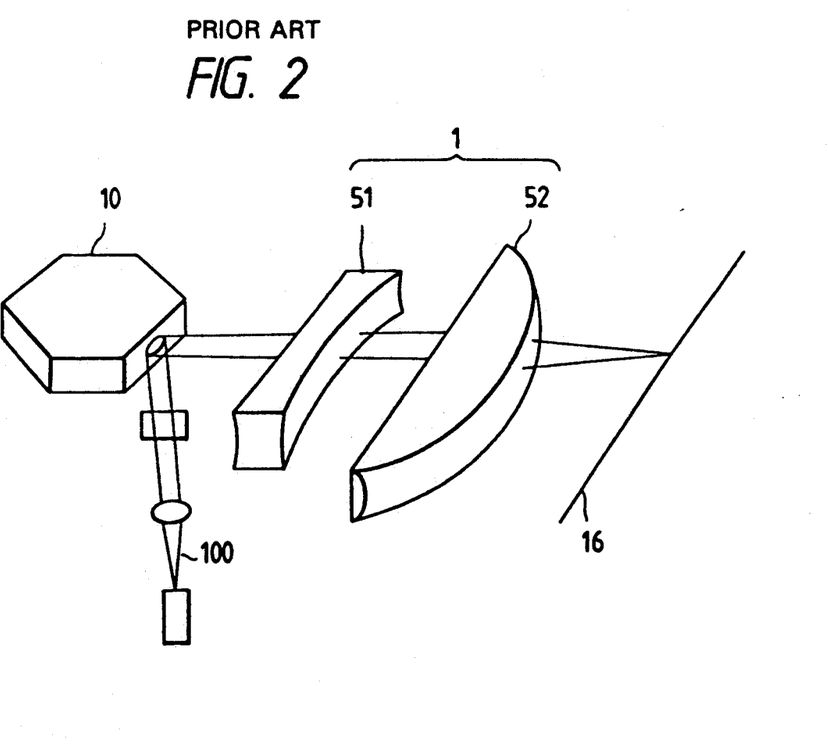
FIG. 2 is a diagram illustrating an optical system of a conventional laser scanner.

The cylindrical surfaces or toric surfaces are generally applied to the second lens 52 which is the lens furthest from the rotary polyhedral mirror 10. It is preferable to place the cylindrical or toric surfaces on the second lens since, if the cylindrical or toric surfaces were applied to the first lens 51 (i.e. the lens nearest the rotary polyhedral mirror 10), then the lateral magnification in the sub-scanning direction would become too large (i.e., 5 or more). This enlarged lateral magnification would necessitate an extremely accurate arrangement between the rotary polyhedral mirror 10 and the F$\theta$ lens system 1.

Further, Japanese Patent Unexamined Publication No. Sho. 62-265615 discloses a technique for asymmetrically changing the curvature of the F$\theta$ lens system 1 in the direction vertical to the sub-scanning direction of the F$\theta$ lens system 1. This asymmetrical change occurs with respect to the rotary axis and is in accordance with the position of deflection, thereby correcting the above noted error.

In order to increase the precision, with which a laser printer draws figures, it is necessary to ensure that the field curvature falls within the depth of focus along the entire scanning plane. By maintaining the field curvature within the depth of focus, the system prevents defocusing of a very small laser spot and improves displacement, linearity, etc. in scanning, thereby improving the performance of the F$\theta$ lens system.

A conventional F$\theta$ lens system constructed with two single lenses, can correct sufficiently aberrations of distortion of third-order or less. However, it remains difficult to correct aberrations of distortion of fifth-order or more. More specifically, when laser beam scanning is performed with a wide viewing angle, there is a large influence due to distortion in the peripheral portion of the viewing angle. For example, an F$\theta$ characteristic value (i.e. the displacement characteristic on a scanning plane) is about 0.22% when the scanning width is 300 mm and the viewing angle is ±31°. In this situation, the F$\theta$ characteristic value represents an error distance between a light spot (at which the beam focuses) and a scanning spot (at which the laser beam should focus) on a scanning plane. The F$\theta$ characteristic relates to the linearity of the relation between the laser beam's drawing point and the scanning angle of the rotary polyhedral mirror.

If the number of the lenses is increased to three or more, the F$\theta$ characteristic can be improved. However, this increases the number of parts and increases the complexity of assembly and thus, such a system could not be employed simply.

The correction limitation in the above-mentioned conventional F$\theta$ lens system will be described in more detail with reference to FIGS. 3-7.

Figure 3:
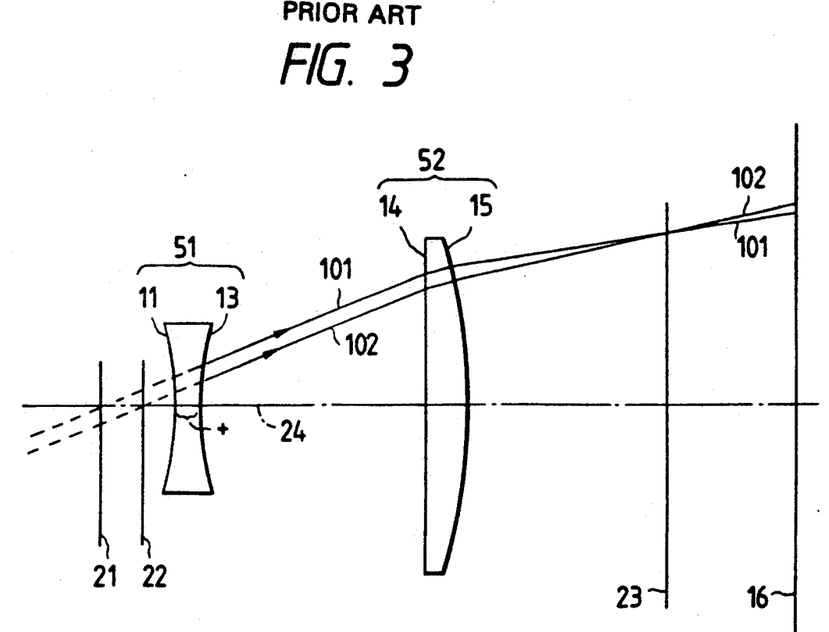
FIG. 3 is a diagram for explaining the path of light in the optical system of the conventional laser scanner.

FIG. 3 represents a top view of FIG. 2, and illustrates two parallel light beams 101 and 102, which have different entrance pupil positions. These parallel light beams are focused in the vicinity of an image-side focal plane 23 of the second lens 52. The points at which the light beams 101 and 102 intersect an optical axis 24 represent their entrance pupil positions 21 and 22 for the second lens 52. The entrance pupil positions affect the aberrations of distortion.

The first lens 51 includes concave lens surfaces 11 and 13 having axes of rotational symmetry. The second lens 52 includes a spherical or planar lens surface 14 having an axis of rotational symmetry, and a convex lens surface 15 which is rotationally asymmetric. The first lens 51 has a negative power (i.e. a beam incident thereto is bent away from the optical axis 24), and the second lens 52 has a positive power (i.e. a beam incident thereto is bent towards the optical axis 24). This positive and negative power arrangement tends to cause the scanning positions to shift toward the optical axis (negative side) along the outer peripheral portion of the scanning plane 16 for the entire F$\theta$ characteristic. This tendency can be corrected by moving the above-mentioned entrance pupil positions toward the second lens 52 as the scanning angles are increased.

Figure 4:
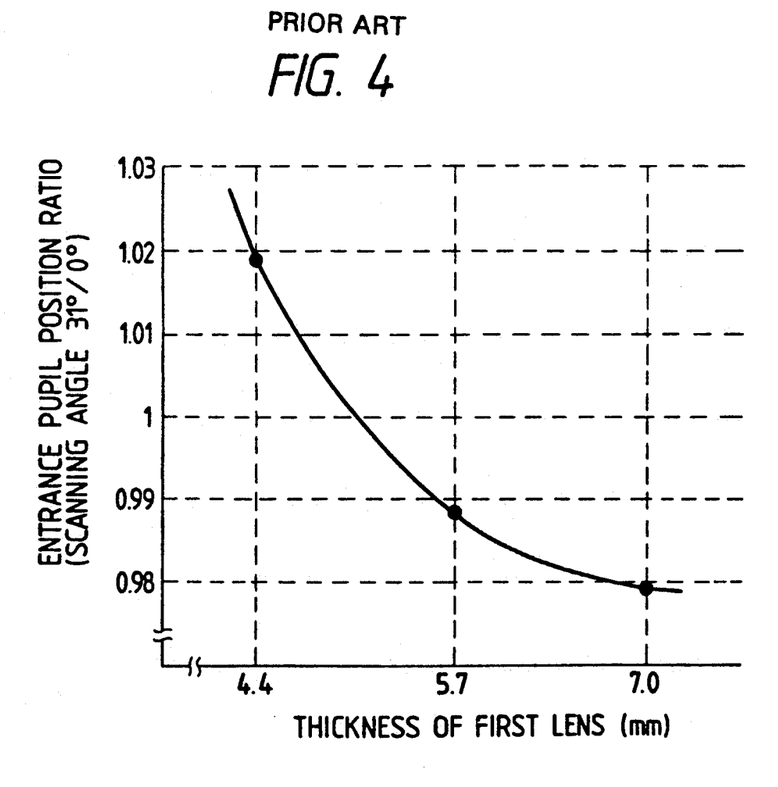
FIG. 4 is a diagram illustrating a specific characteristic of the entrance pupil position of the optical system of the conventional laser scanner.

FIG. 4 illustrates the relation between the ratio (as plotted along the ordinate) of the entrance pupil positions at the scanning angles 0° and 31°, and the thickness t (as plotted along the abscissa) of the center portion of the first lens 51. The entrance pupil positions represents the distances measured from the lens surface 14 of the second lens 52 to the points at which a light beam intersects the optical axis 24. The relation in FIG. 4 was calculated while the shapes of the lens surfaces 11 and 13 remained constant. The ratio of the entrance pupil positions represent the ratio between the distance when the rotary mirror is at a scanning angle of 0° and the distance when the rotary mirror is at a scanning angle of 31°. FIG. 4 illustrates that it is desirable to increase the thickness t of the center portion of the first lens 51, because a more preferred result can be obtained if the entrance pupil positions are made closer to lens 51 when the scanning angle is large.

Figure 5:
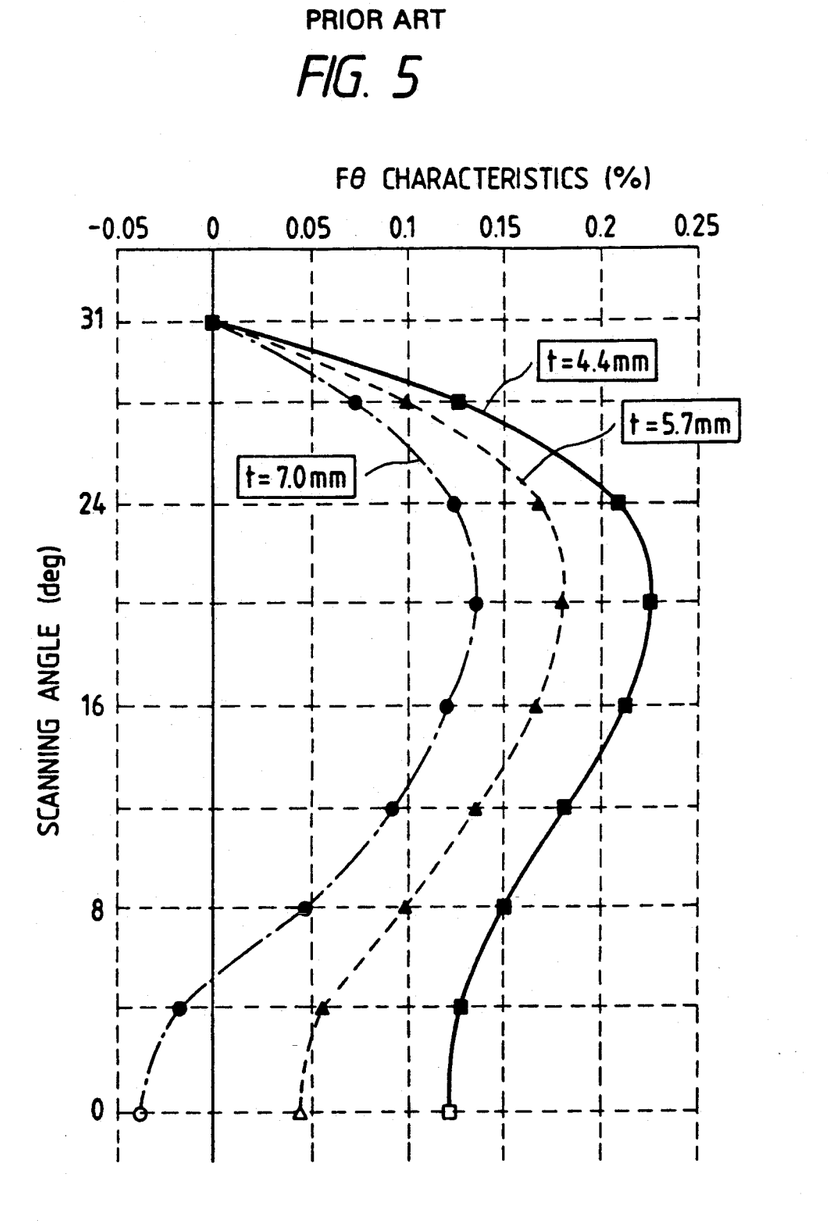
FIG. 5 is a diagram illustrating an Fθ characteristic of the optical system of the conventional laser scanner.

FIG. 5 illustrates the relation between the Fθ characteristic and the scanning angle from 0° to 31°, for three different thicknesses t of the center portion of the first lens 51. FIG. 5 shows that the Fθ characteristic curve between the scanning angles of 0° and 31° is shifted towards the negative side as the thickness t of the first lens center portion is made thinner. Thus the above-mentioned entire Fθ characteristic can be corrected if the thickness t of the center portion is increased. More directly, if changing the thickness t of the center portion of the first lens 51 only affected the Fθ characteristic and the Fθ characteristic was preferably below 0.15%, then the thickness t could be set to t ≧ 7.0 mm. However, changing the thickness t also changes other lens characteristics, as explained hereafter.

Figure 6:
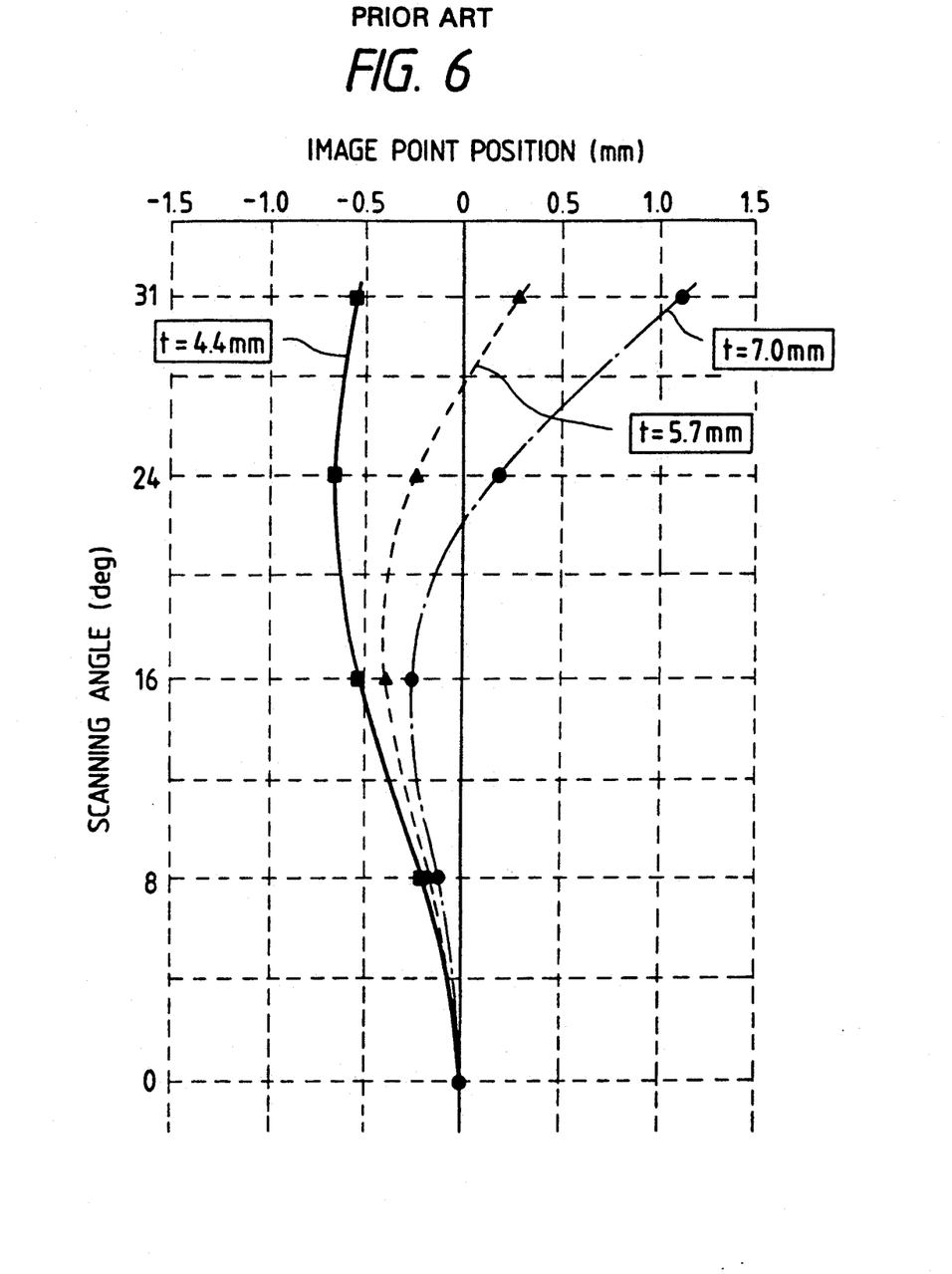
FIG. 6 is a diagram illustrating a characteristic of the image spot position of the optical system of the conventional laser scanner.

FIG. 6 shows the relationship between the field curvature and the scanning angle for three different thicknesses t of the center portion of the first lens 51, as the scanning angle varies from 0° to 31°. The field curvature represents the distance between the scanning plane 16 and the image point position along the image side focal plane 23. FIG. 6 illustrates that the image plane 23 tends to bend inward from the scanning plane 16 (i.e. toward the lens 52) when the thickness t of the center portion is 4.4 mm. The image plane tends to bend outward (i.e. away from the lens 52) when the thickness t is 7.0 mm. Thus, FIG. 6 illustrates that an optimum region for the thickness t exists which minimizes the field curvature and which positions the image plane on or substantially near the scanning plane 16.

Preferably, the field curvature is made within the depth of focus, which is, for example, about ±1.0 mm when the dot density is 480 dpi (dots per inch). The depth focus is approximately ±0.6 mm, when the dot density is 600 dpi. Both exemplary depths of focus assume that the laser's beam spot diameter is allowed to change up to 5% when the laser light has a wave length of 80 nm.

Figure 7:
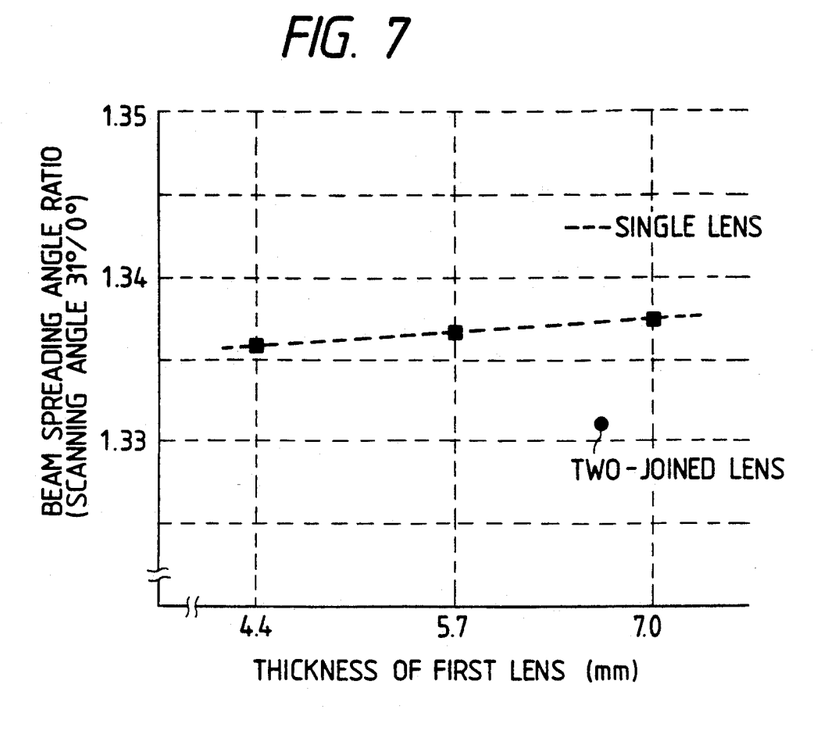
FIG. 7 is a diagram illustrating a specific characteristic of the beam spreading angle of the optical system of the conventional laser scanner.

FIG. 7 illustrates the relation between the beam spreading angle ratio at scanning angles of 0° and 31° and the thickness t of the first lens 51. If the spreading angle of a beam incident on the second lens 52 can be made small at a position in which the scanning angle is large, then the field curvature can be reduced, even when the thickness t of the center portion is large. However, as shown in FIG. 7, the ratio of the above-mentioned spreading angles of an incident beam (i.e. the ratio between the spreading angle at a 0° scanning angle and the spreading angle at a 31° scanning angle) is substantially independent of the thickness t of the center portion of the first lens 51. Thus, it is difficult to reduce the spreading angle for improving the field curvature by changing the first lens' thickness t.

The results of the above analysis can be summarized as follows. The thickness t of the center portion of the first lens 51 can be used, as a practical design parameter, to improve the aberration of distortion or the field curvature in a conventional Fθ lens system that includes two single lenses. However, the field curvature and Fθ characteristic can not be improved simultaneously by adjusting the thickness of lens 51. Specifically, the field curvature cannot be corrected within the range of lens thicknesses t which provide a superior Fθ characteristic.

SUMMARY OF THE INVENTION

It is therefore an object of the present invention to solve the foregoing problems.

It is an object of the present invention to provide a novel high performance laser scanner which gives a practical degree of design freedom for the first lens of an Fθ lens system to reduce the aberrations of distortion and the field curvature at the same time, thereby reducing the picture distortion and increasing the system's precision.

In order to obtain the foregoing objects, the present invention includes a laser scanner, that has a rotary polyhedral mirror for scanning a light beam from a laser light source, and an Fθ lens system. The Fθ lens system includes first and second lenses through which the light beam is radiated onto a scanning plane. The first lens of the Fθ lens system is provided on the rotary polyhedral mirror side and is constructed with a joined lens.

Since one of the two single lenses in a conventional Fθ lens system is replaced by a joined lens, the number of refractive sides is increased to five, which is more than the conventional system's four refractive sides. This fifth side increases the degrees of freedom for designing curvature, side distance, refractive indices, etc. in the Fθ lens system by one point. As a result, it is possible to design an Fθ lens system with higher precision, so that it is possible to ensure that the field curvature falls within the depth of focus, and to correct an aberration of distortion of fifth-order or more at the same time.

In addition, if the above-mentioned joined lens is used as a single lens on the rotary polyhedral mirror side, optical axes of the two joined portions are easily matched, which improves the production.

BRIEF DESCRIPTION OF THE DRAWINGS

Other features and advantages of the present invention will become apparent from the following description taken in connection with the accompanying drawings, wherein.

DETAILED DESCRIPTION OF THE PREFERRED EMBODIMENTS

Figure 1:
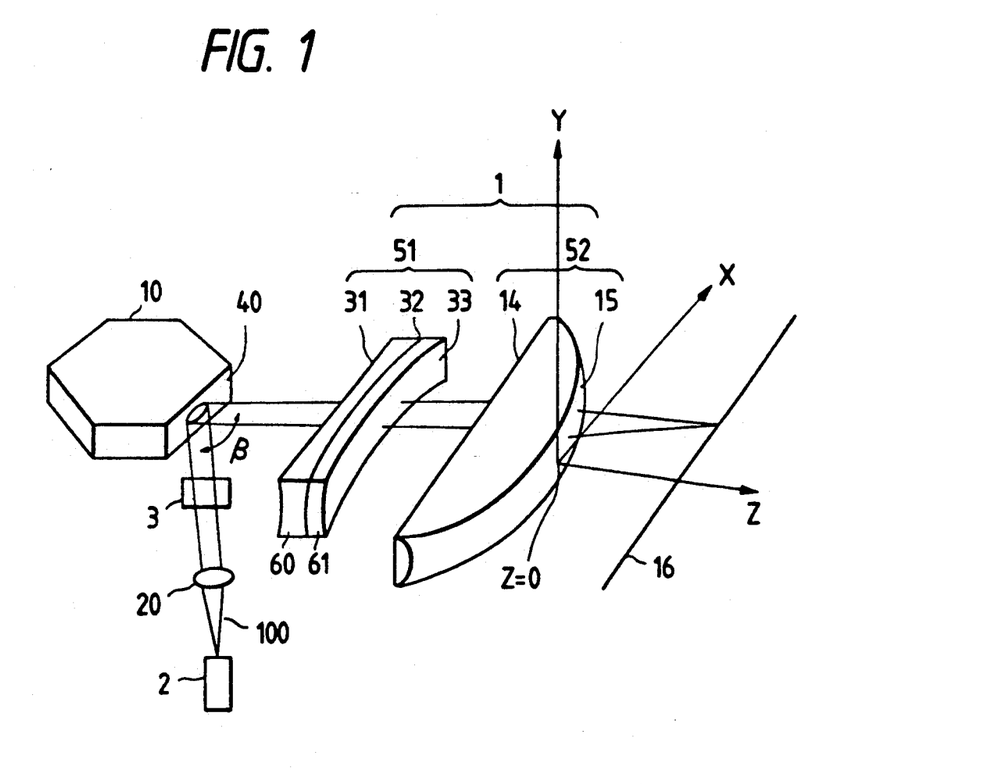
FIG. 1 is a diagram illustrating an optical system of a laser scanner according to the present invention.

FIG. 1 shows the configuration of the laser scanner according to the present invention. A first lens 51 is constructed from a joined lens which is composed of two components 60 and 61. The first lens 51 includes two concave lens surfaces 31 and 33, the shapes of which differ from the shapes of surfaces 11 and 13 in FIG. 3. The shapes of surfaces 31 and 33 are constructed in accordance with the shape of a joined surface 32, the refractive indices of the materials from which the components 60 and 61 are made, etc.

In FIG. 1, a laser light 100 from a laser light source 2 is constructed to emit parallel rays, via a collimator lens 20. The parallel rays are focused in the y-direction (sub-scanning direction) onto a reflection surface 40 of a rotary polyhedral mirror 10, in order to vertically flatten the shape of the beam spot as illustrated. When the $F\theta$ lens system 1 scans a scanning plane 16, the light beam, which is flattened in the y-direction, also passes through a cylindrical lens 3, which reduces the light beam in the x-direction (main scanning direction). Further, the reflection surface 40 and the scanning plane 16 have a geometrical/optical conjugate relationship in the y-direction (sub-scanning direction).

Table 1 shows an example of various dimensions of the $F\theta$ lens system 1 according to the present invention. In Table 1, R represents a radius of curvature in the x-direction (main scanning direction), r represents a radius of curvature in the y-direction (sub-scanning direction), d represents the distance between adjacent surfaces, and n represents a refractive index. In addition, the side number S1 denotes the reflection surface 40 of the rotary polyhedral mirror 10, side number S2 denotes the concave lens surface 31 of the first lens 51, side number S3 represents the joined surface 32 of the first lens 51, side number S4 represents the concave lens surface 33 of the first lens 51, and side numbers S5 and S6 represent lens surfaces 14 and 15 of the second lens 52, respectively. In addition, side number S7 denotes the scanning plane 16. In Table 1, the radius of the curvature in the x-direction for each of sides S2–S4 equals the radius of curvature in the y-direction for the same side.

TABLE 1

| Side Number | R | r | d | n |
| --- | --- | --- | --- | --- |
| S1 | ∞ | ∞ | 26.6 | 1.0 |
| S2 | −964 | −964 | 3.3 | 1.731 |
| S3 | 800 | 800 | 3.3 | 1.614 |
| S4 | 964 | 964 | 44.45 | 1.0 |
| S5 | ∞ | ∞ | 17.9 | 1.719 |
| S6 | −153 | −47.57 | 305.4 | 1.0 |
| S7 | ∞ | ∞ | | |

The shape of the surface S6 is defined by the following equations (1) and (2):

$$Z = \sqrt{(Z' + R + r_0)^2 - X^2} - (R + r_0) + aY^4 + bX^2Y^2 + C \quad (1)$$

$$Z' = -Y^2/r_0 \{1 + \sqrt{1 + (Y/r_0)^2}\} \quad (2)$$

where $a = 1.27E-6$ and $b = 3.02E-7$

The values a and b in the first equation (1) are constants. The value C is an asymmetrical term which is a sample point. The value C varies as shown in Table 2, based on the X and Y coordinate values by approximation through a polynomial expression.

TABLE 2

(Unit X,Y: mm, C: μm)

| X \ Y | −8 | −4 | 0 | 4 | 8 |
| --- | --- | --- | --- | --- | --- |
| −65 | 5.6 | 1.4 | 0 | 1.4 | 5.6 |
| −50 | 5.04 | 1.26 | 0 | 1.26 | 5.04 |
| −35 | 2.98 | 0.74 | 0 | 0.74 | 2.98 |
| −20 | 1.55 | 0.39 | 0 | 0.39 | 1.55 |
| 0 | 0 | 0 | 0 | 0 | 0 |
| 20 | −1.76 | −0.44 | 0 | −0.44 | −1.76 |
| 35 | −3.38 | −0.84 | 0 | −0.84 | −3.38 |
| 50 | −4.91 | −1.23 | 0 | −1.23 | −4.91 |
| 65 | −5.32 | −1.33 | 0 | −1.33 | −5.32 |

Figure 8:
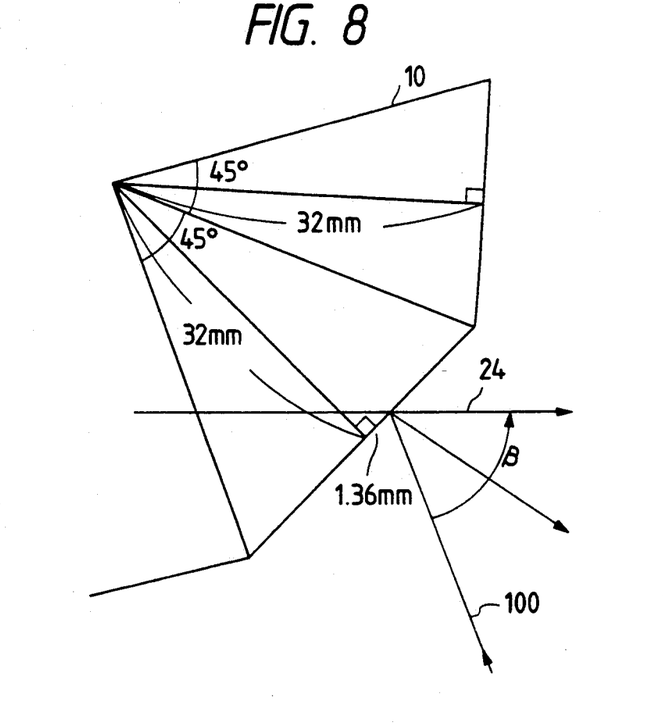
FIG. 8 is a diagram illustrating the relationship between the rotary polyhedral mirror and the laser beam angle of the present invention.

FIG. 8 shows the positional relationship between the rotary polyhedral mirror 10 and the laser light 100 incident thereto. The radius of the rotary polyhedral mirror 10 is selected to be 32 mm, and the number of the surfaces thereof is selected to be 8. The laster light 100 is incident on the rotary polyhedral mirror 10 at the angle of incidence $\beta = 60°$ relative to the optical axis. The laser light 100 reflected on the rotary polyhedral mirror 10 is focused through the $F\theta$ lens system 1 to perform scanning throughout a viewing angle range of ±31°.

Figure 9:
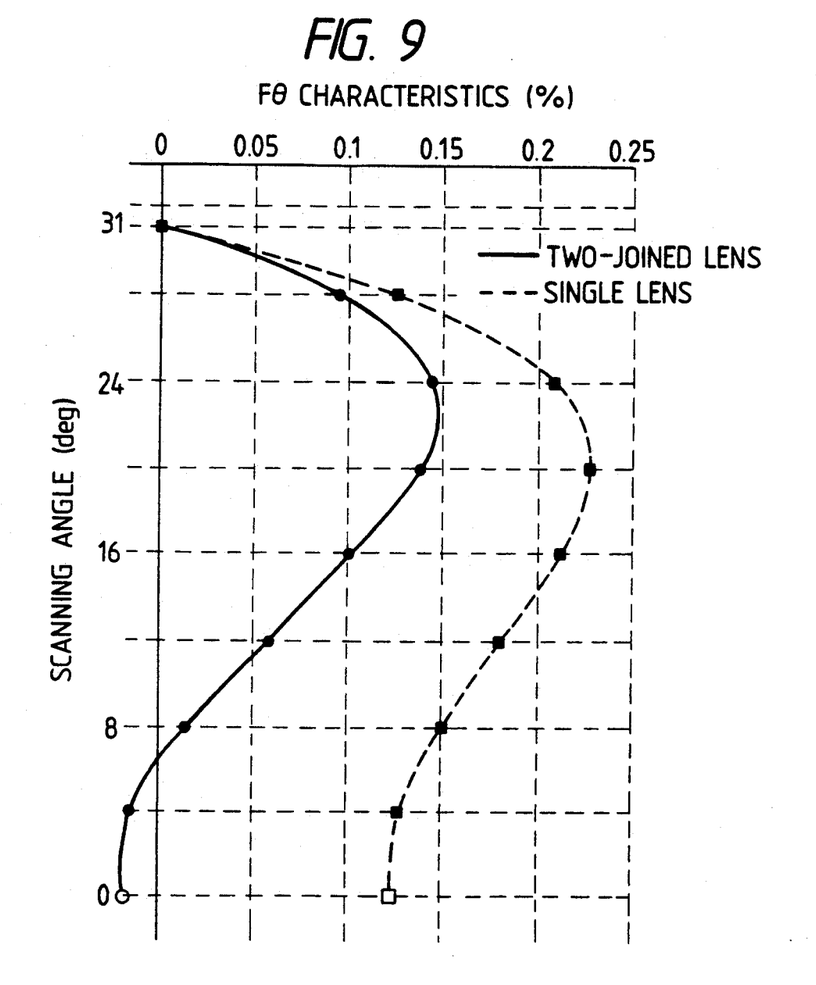
FIG. 9 is a diagram for comparing Fθ characteristics in the optical system of the laser scanner according to the present invention and the conventional one.

In FIG. 9, a solid line shows the $F\theta$ characteristic for the above noted embodiment of the present system (as illustrated in FIG. 1), and the dotted line shows an $F\theta$ characteristic of the conventional system (FIG. 2). As is apparent from FIG. 9, when the first lens includes the joined surface 32, the $F\theta$ characteristic value can be reduced along the entire scanning area to ⅓ of the $F\theta$ characteristic value provided by the above noted conventional system. Particularly, the present system can maintain a $F\theta$ characteristic within ±0.15%.

Figure 10:
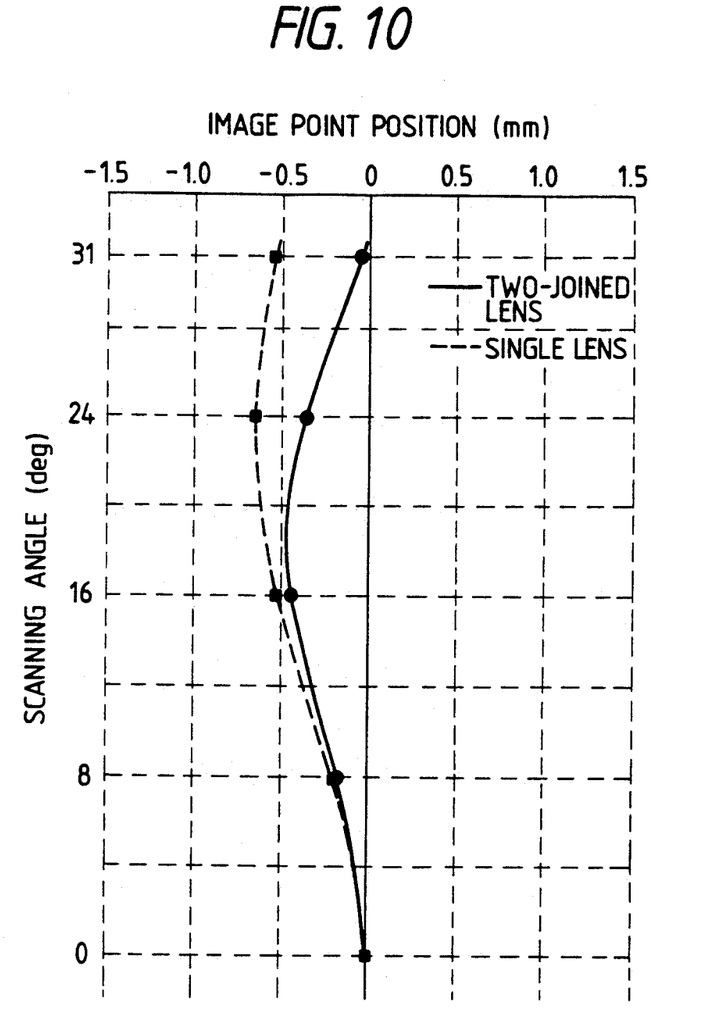
FIG. 10 is a diagram for comparing characteristics of the image spot position in the optical system of the laser scanner according to the present invention and the conventional one.

FIG. 10 shows the relation between the field curvature and scanning angle, in which the solid line shows the position of an image spot in the present system (FIG. 1), and the dotted line shows the position of an image spot in the conventional system (FIG. 2). As shown by the solid line, the field curvature is maintained within ±0.5 mm of the scanning plane 16 along the scanning area, thereby satisfying the above-mentioned depth of focus ±0.6 mm at 600 dpi (dots per inch).

Table 3 shows various dimensions for an $F\theta$ lens system constructed by the conventional single lenses, and Table 4 shows the sample points for the asymmetrical term C. In Table 3, side number S1 corresponds to the reflection surface 40, side number S2 corresponds to the lens surface 11, side number S3 corresponds to lens surface 13, side number S4 corresponds to lens surface 14, side number S5 corresponds to lens surface 15 and side number S6 corresponds to the scanning plane 16.

TABLE 3

$a = 1.27E-6$ and $b = 2.99E-7$

| Side Number | R | r | d | n |
| --- | --- | --- | --- | --- |
| S1 | ∞ | ∞ | 26.6 | 1.0 |
| S2 | −993 | −993 | 4.8 | 1.719 |
| S3 | 871 | 871 | 47.2 | 1.0 |
| S4 | ∞ | ∞ | 17.9 | 1.719 |
| S5 | −153 | −47.89 | 305.4 | 1.0 |
| S6 | ∞ | ∞ | | |

TABLE 4

| | (Unit X,Y: mm, C: μm) | | | | |
|---|---|---|---|---|---|
| X  Y | −8 | −4 | 0 | 4 | 8 |
| −65 | 5.6 | 1.4 | 0 | 1.4 | 5.6 |
| −50 | 5.04 | 1.26 | 0 | 1.26 | 5.04 |
| −35 | 2.98 | 0.74 | 0 | 0.74 | 2.98 |
| −20 | 1.60 | 0.40 | 0 | 0.40 | 1.60 |
| 0 | 0 | 0 | 0 | 0 | 0 |
| 20 | −1.76 | −0.44 | 0 | −0.44 | −1.76 |
| 35 | −3.28 | −0.82 | 0 | −0.82 | −3.28 |
| 50 | −4.80 | −1.20 | 0 | −1.20 | −4.80 |
| 65 | −5.32 | −1.33 | 0 | −1.33 | −5.32 |

The present system improves the Fθ characteristic (i.e. displacement characteristic on a scanning plane), the characteristic of field curvature (i.e. the defocusing characteristic of an image on the scanning plane), etc., so that it is possible to provide a higher performance laser scanner which reduces the distortion of a picture image and improves the degree of precision.

What is claimed is:

1. A laser scanner, comprising:
   a laser light source for emitting a laser light beam into a scanning plane;
   a mirror for moving said light beam along said scanning plane; and
   an Fθ lens system including first and second lenses through which said light beam is radiated onto said scanning plane, said first lens including a joined lens, and wherein said joined lens includes first and second lens components, each of which has first and second surfaces, the first surface of the first lens component being joined with the first surface of the second lens component, and wherein said second surface of said first lens component is concave toward the mirror and said second surface of said second lens component is concave toward the scanning plane.

2. A laser scanner, according to claim 1, wherein said first lens is positioned between said mirror and said scanning plane.

3. A laser scanner, according to claim 1, wherein said mirror is a rotary polyhedral mirror.

4. A laser scanner, according to claim 1, wherein said second lens is positioned between said mirror and said scanning plane, said second lens consisting of a single lens having an aspherical surface, said aspherical surface on said single lens having a radius of curvature in a main scanning direction and a radius of curvature in a sub-scanning direction which are different from each other.

5. A laser scanner, according to claim 4, wherein said radius of curvature in the sub-scanning direction of the aspherical surface of said second lens changes continuously.

6. A laser scanner, according to claim 1, wherein said second lens is positioned between said mirror and said scanning plane, said second lens comprising of a single lens having an aspherical surface, said aspherical surface on said single lens having a radius of curvature in a main scanning direction and a radius of curvature in a sub-scanning direction which are different from each other.

7. A laser scanner, according to claim 6, wherein said radius of curvature in the sub-scanning direction of the aspherical surface of said second lens changes continuously.

8. A laser scanner, according to claim 1, wherein the first and second lenses correct for aberrations of distortion up to fifth-order and for field curvature.

9. A laser scanner, comprising:
   a laser light source for emitting a laser light beam onto a scanning plane;
   a mirror for moving said light beam along said scanning plane; and
   an Fθ lens system including first and second lenses through which said light beam is radiated onto said scanning plane, said first lens including a joined lens, wherein said joined lens includes fir st and second lens components, each of which has first and second surfaces, the first surface of the first lens component being joined with the first surface of the second lens component, and wherein each of said first and second surfaces of said first and second lens components has a radius of curvature in a main scanning direction that equals a radius of curvature in a subscanning direction.

10. A laser scanner, according to claim 9, wherein said first lens is positioned between said mirror and said scanning plane.

11. A laser scanner, according to claim 9, wherein said mirror is a rotary polyhedral mirror.

12. A laser scanner, according to claim 9, wherein said second lens is positioned between said mirror and said scanning plane, said second lens consisting of a single lens having an aspherical surface, said aspherical surface on said single lens having a radius of curvature in a main scanning direction and a radius of curvature in a sub-scanning direction which are different from each other.

13. A laser scanner, according to claim 12, wherein said radius of curvature in the sub-scanning direction of the aspherical surface of said second lens changes continuously.

14. A laser scanner, according to claim 9, wherein said second lens is positioned between said mirror and said scanning plane, said second lens comprising a single lens having an aspherical surface, said aspherical surface on said single lens having a radius of curvature in a main scanning direction and a radius of curvature in a sub-scanning direction which are different from each other.

15. A laser scanner, according to claim 14, wherein said radius of curvature in the sub-scanning direction of the aspherical surface of said second lens changes continuously.

16. A laser scanner, according to claim 9, wherein said first and second lenses correct for aberrations of distortion up to fifth-order and for field curvature.

* * * * *